(12) United States Patent
Gerard et al.

(10) Patent No.: US 11,347,306 B2
(45) Date of Patent: May 31, 2022

(54) METHOD AND APPARATUS FOR CONTROLLING A DISCREPANT AIMING DIRECTION OF A CAMERA

(71) Applicant: INTERDIGITAL CE PATENT HOLDINGS, SAS, Paris (FR)

(72) Inventors: Francois Gerard, Beignon (FR); Fabien Danieau, Rennes (FR); Renaud Dore, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 478 days.

(21) Appl. No.: 16/065,382

(22) PCT Filed: Dec. 19, 2016

(86) PCT No.: PCT/EP2016/081693
§ 371 (c)(1),
(2) Date: Jun. 22, 2018

(87) PCT Pub. No.: WO2017/108668
PCT Pub. Date: Jun. 29, 2017

(65) Prior Publication Data
US 2020/0363866 A1 Nov. 19, 2020

(30) Foreign Application Priority Data
Dec. 22, 2015 (EP) .................................... 15307094

(51) Int. Cl.
*G06F 3/01* (2006.01)
*A63F 13/525* (2014.01)
*H04N 5/232* (2006.01)
(52) U.S. Cl.
CPC ............ *G06F 3/012* (2013.01); *A63F 13/525* (2014.09); *H04N 5/232* (2013.01); *A63F 2250/497* (2013.01)

(58) Field of Classification Search
CPC ........ G06F 3/012; G06F 3/011; A63F 13/525; A63F 13/5258
See application file for complete search history.

(56) References Cited

U.S. PATENT DOCUMENTS 5,588,914 A  12/1996  Adamczyk
9,317,776 B1 *  4/2016  Honda ....................... G06T 7/90
(Continued)

FOREIGN PATENT DOCUMENTS

CN  101542584    9/2009
CN  101542584 A  9/2009
(Continued)

OTHER PUBLICATIONS

Lecuyer, A., "Anatole Lecuyer—Homepage", http://people.rennes.inria.fr/Anatole.Lecuyer/, Jan. 26, 2016, pp. 1-15.
(Continued)

*Primary Examiner* — Sepehr Azari
(74) *Attorney, Agent, or Firm* — Invention Mine LLC (57) ABSTRACT

The present disclosure relates to methods, apparatus or systems for determining an aiming direction (22) of a remote motorized camera (10). The immersive video content captured by the camera (10) is associated with reference directions (13). Parameters of a discrepancy function (32, 42, 53) are calculated. This function is used to control the aiming direction (22) of the camera. It introduces a discrepancy between the rotation wanted by the user (21) and the rotation of the camera (22). An example purpose of the present disclosure is to encourage a user to rotate the camera toward reference directions, preventing him/her to rotate the camera toward the opposite direction. The present principles have the advantage to create pseudo-haptic effects, inciting the user to look toward a reference direction without making him/her sick.

26 Claims, 6 Drawing Sheets

(56) References Cited

U.S. PATENT DOCUMENTS

| | | |
|---|---|---|
| 9,846,304 B2 | 12/2017 | Sako |
| 9,928,653 B2 | 3/2018 | Atsmon |
| 2007/0022455 A1 | 1/2007 | Endou |
| 2010/0225583 A1* | 9/2010 | Ohta ............... A63F 13/219 345/158 |
| 2011/0234820 A1 | 9/2011 | Lee et al. |
| 2012/0050143 A1 | 3/2012 | Border |
| 2012/0165099 A1 | 6/2012 | Ito et al. |
| 2012/0229454 A1* | 9/2012 | Hayashi ........... A63F 13/211 345/419 |
| 2013/0330705 A1 | 12/2013 | Grimaud et al. |
| 2014/0063275 A1* | 3/2014 | Krahenbuhl ......... H04N 19/117 348/208.4 |
| 2014/0111551 A1* | 4/2014 | Suzuki ............... G06F 3/0485 345/661 |
| 2014/0111601 A1 | 4/2014 | Lee |
| 2014/0268356 A1 | 9/2014 | Bolas |
| 2014/0327666 A1* | 11/2014 | Suzuki ............... G06T 19/006 345/419 |
| 2015/0097873 A1 | 4/2015 | Nakada et al. |
| 2015/0168716 A1 | 6/2015 | Gotoda |
| 2015/0213778 A1 | 7/2015 | Moravetz |
| 2015/0352438 A1* | 12/2015 | Suzuki ............... A63F 13/213 345/156 |
| 2017/0076497 A1* | 3/2017 | Inomata ........... G06F 3/0346 |

FOREIGN PATENT DOCUMENTS

| | | |
|---|---|---|
| CN | 103488994 | 1/2014 |
| CN | 104977717 | 10/2015 |
| CN | 104977717 A | 10/2015 |
| EP | 1883850 | 7/2012 |
| EP | 2725457 B1 | 7/2019 |
| JP | 2014155083 A | 8/2014 |
| JP | 2015026185 | 2/2015 |
| JP | 2015095045 A | 5/2015 |
| JP | 2015230699 A | 12/2015 |
| KR | 20120105201 A | 9/2012 |
| RU | 2013147677 A | 4/2015 |
| WO | WO2013179424 | 12/2013 |
| WO | 2015183621 A1 | 12/2015 |

OTHER PUBLICATIONS

International Search Report and Written Opinion of the International Searching Authority for PCT/EP2016/081693 dated Apr. 3, 2017, 9 pages.

International Preliminary Report on Patentability for PCT/EP2016/081693 dated Jun. 26, 2018, 6 pages.

* cited by examiner

METHOD AND APPARATUS FOR CONTROLLING A DISCREPANT AIMING DIRECTION OF A CAMERA

This application claims the benefit, under 35 U.S.C. § 365 of International Application PCT/EP2016/081693, filed Dec. 19, 2016, which was published in accordance with PCT Article 21(2) on Jun. 29, 2017, in English, and which claims the benefit of European patent application No. 15307094.1 filed Dec. 22, 2015.

1. TECHNICAL FIELD

The present disclosure relates to the domain of pseudo-haptic feedback when controlling a camera, for example when consuming immersive video content, for instance with a head mounted displays (HMD) or a TV set or a mobile device such as a tablet or a smartphone.

2. BACKGROUND

Controlling the aiming direction of a camera has been accomplished in a variety of prior systems. It is useful when the camera is immersed in an environment wider than what the camera can capture. Such systems are used for TV shows recording or for security camera remote control for instance.

Virtual cameras in games or in immersive content renderers can also be considered as equipped with an aiming direction control system.

When controlling the aiming direction of a camera, the user can watch a 4π steradians environment through camera rotations. If such a feature may appear as a real improvement in terms of immersion in the content, as the user is watching at only a part of the environment, he/she may not look to the direction he/she should look to at a given moment. Indeed, as the user can gaze all around as he/she was in place of the camera, he/she may miss some important events, like highlights of the narration, because he/she is watching another part of the content at the moment the event happens.

According to the background, it is known that forcing a camera panning in order to make the user look toward a reference direction is a very efficient solution. However, it is well known that this solution has drawbacks. For instance, it will make most of people lose their visual cues or make them sick and, as a consequence, it will deteriorate the user's quality of experience.

3. SUMMARY

An example purpose of the present disclosure is to encourage a user to rotate a camera toward a reference direction, preventing him/her to rotate the camera toward the opposite direction.

The present disclosure relates to a method of determining an aiming direction of a camera, the method comprising:
  obtaining a set of at least one reference direction;
  obtaining second parameters of at least one controller associated with the camera;
  calculating first parameters representative of a discrepancy function, according to the reference directions, and the discrepancy function being representative of a discrepancy between the aiming direction to determine and the direction defined by the second parameters of the camera controllers; and
  calculating the aiming direction of the camera by applying the discrepancy function on the second parameters of the at least one controller.

According to a particular characteristic, said discrepancy function is a sigmoid-like function.

According to an embodiment, at least one reference direction of said set is determined according to a location of the camera and a location of another object.

In a variant of the method the number of reference directions of said set is changing over the time.

Advantageously, at least one reference direction of said set is associated with reference parameters that are used for computing said first parameters representative of the discrepancy function.

According to another variant, at least one reference direction of said set changes over the time.

According to an embodiment, further comprising transmitting said aiming direction to said camera.

The present disclosure also relates to an apparatus configured for determining an aiming direction of a camera, the apparatus comprising:
  Means for obtaining a set of at least one reference direction;
  At least one controller associated with the camera for obtaining second parameters representative of direction commands;
  A processor for calculating first parameters representative of a discrepancy function according to the reference directions, the discrepancy function being representative of a discrepancy between the aiming direction to determine and a direction defined by the second parameters of the controllers; and
  A processor configured to calculate the aiming direction of the camera by applying the discrepancy function on the second parameters of the at least one controller.

The present disclosure also relates to an apparatus configured for determining an aiming direction of a camera, the apparatus comprising at least one processor configured to:
  Obtain a set of at least one reference direction,
  Calculate first parameters representative of a discrepancy function according to said set of at least one reference direction,
  Obtain second parameters representative of direction commands from a controller associated with the camera,
  Calculate the aiming direction of the camera by applying the discrepancy function on the second parameters of the at least one controller.

The present disclosure also relates to a computer program product comprising instructions of program code for executing, by at least one processor, the abovementioned method of determining an aiming direction of a camera, when the program is executed on a computer.

The present disclosure also relates to a non-transitory processor readable medium having stored therein instructions for causing a processor to perform at least the abovementioned method of composing an image representative of a texture.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

For the sake of clarity, FIGS. 1 to 5 illustrate examples in two dimensions and refer to the only "yaw" angle (i.e. a rotation around the Z-axis). It is understood that the present principles are extendable to a third dimension and to the "pitch" angle (i.e. a rotation around the Y-axis) and to the "roll" angle (i.e. a rotation around the X-axis).

A camera (real or virtual) is located in a place (real or virtual) and surrounded with objects that the camera may film. This constitutes the environment of the camera with which a frame of reference is associated in order to locate objects.

A camera (real or virtual) is associated to a set of parameters relative to the environment the camera is located in. The location of the camera is expressed in the frame of reference associated with the environment. A camera is filming in a given direction that is called the aiming direction of the camera herein after.

Figure 1:
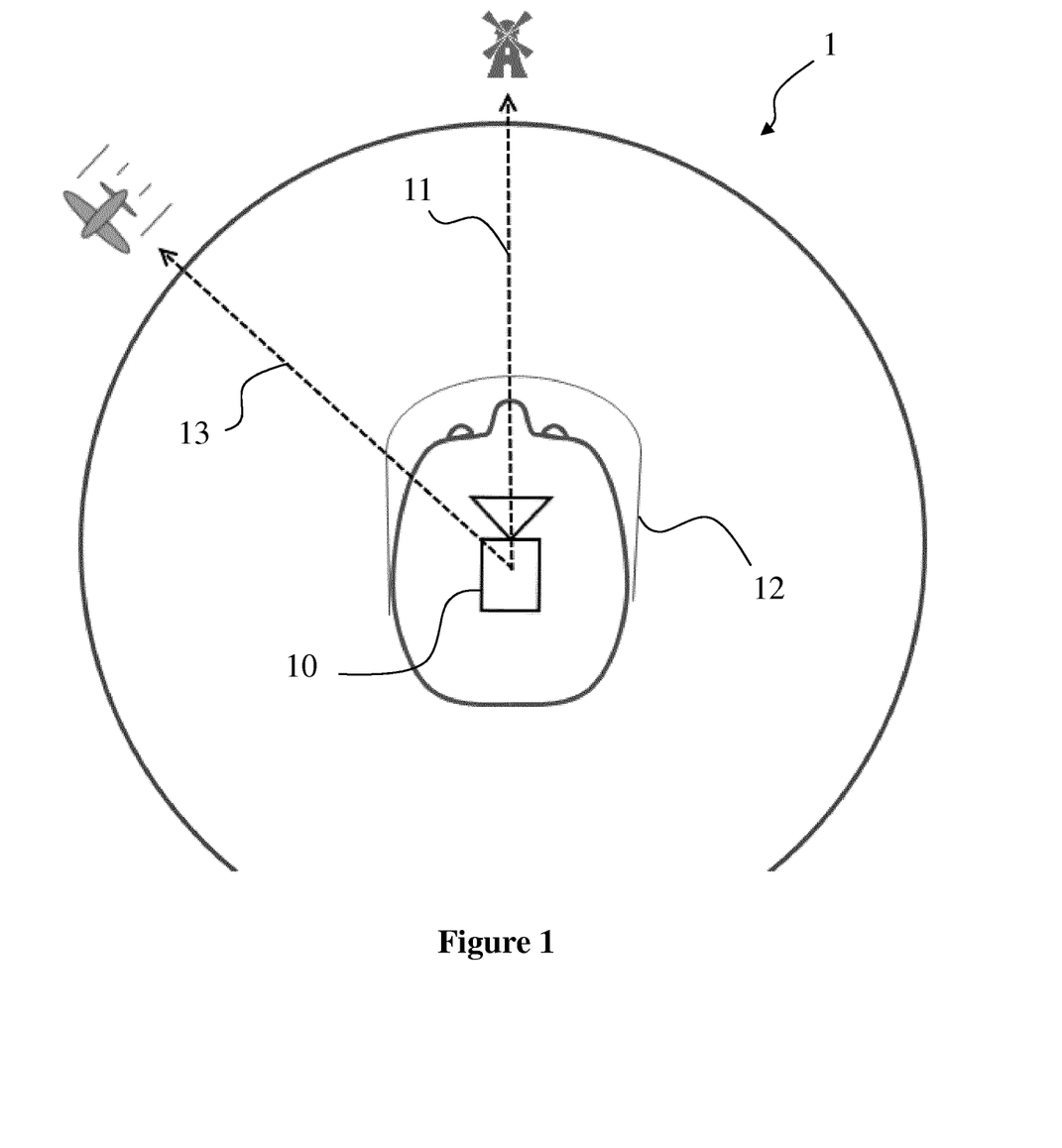
FIG. 1 illustrates a controlled camera system at a determined time t (e.g. the initialization time of the system), according to a specific embodiment of the present principles.

FIG. 1 illustrates a controlled camera system 1 at a determined time t (e.g. the initialization time of the system). A camera 10 associated with a camera aiming direction controller 12. On FIG. 1, the camera controller 12 is represented as a head-mounted display (HMD). Indeed, a HMD may be considered as a camera controller. In an embodiment, a HMD is equipped with a head pose estimation system, for instance an integrated inertial measurement unit (IMU) that may include accelerometers and/or gyroscopes or an external positional tracking system using infra-red cameras for example. When the user is moving, the detected position of his/her head is used to orientate the aiming direction of a camera. The camera 10 is a motorized device placed in a remote location. In a variant the camera 10 is a virtual camera placed in a three-dimensional virtual world.

The camera 10 and the camera controller 12 share a zero direction 11 that is set at the starting of the system. For the sake of clarity, on FIG. 1, the camera 10 and the camera controller 12 are drawn at the same place. In any embodiment, they belong to separated environment. For example, in a security system, cameras are located outside while joysticks for controlling their aiming direction are located in a control station. In the case of a HMD, the IMU belongs to the real world while the camera belongs to a virtual world. The zero direction may be reset to a common value from time to time as it is well known that a drift may progressively appear between the zero direction used on the camera side and its equivalent on the camera controller side. In a first person view application, there is a one to one correspondence between the HMD rotation angle and the camera aiming direction. When the HMD is rotating through a given angle, the camera rotates through the same given angle. In another embodiment, the camera controller is a joystick or a set of keys of a keyboard or a smartphone. In some embodiments, the display on which is rendered what the camera is filming is a TV-set or a computer screen or a mobile device screen like a smartphone or a tablet.

A set of at least one reference direction 13 is obtained. A reference direction correspond to a direction in which the user should look to, for instance, if a highlight of the narration is happening in this direction. Reference directions are provided as metadata of the content and received within the content stream or read from the same file. In a variant, the set of reference directions is obtained from a different source than the content. Both data has to be synchronized. In another variant, the reference directions are obtained thanks to the processing of the images of the content, for example using saliency map to detect regions of interest, a reference direction being associated with each region of interest for example. As reference directions depend on the content, their number and the reference directions themselves may vary over time.

According to an embodiment, the present principles aim at inciting the user to look toward such a reference direction or, as a complementary effect, at preventing the user to look too far away from such a reference direction. In a variant in which the user is exploring a three dimensions (3D) modelled scene as in a video game, the scene may not be modelled in every direction. Indeed, for cost or time reasons, as for cinema stages, only a part of the 360° space may be modelled. In such a case, the producer may want to prevent the user to look to the non-modelled part of the 3D scene or to the technical zone of the cinema stage. In this variant, a reference direction corresponds to a direction distant of the non-modelled direction or the technical zone of the cinema stage. Several reference directions may be obtained at the same time. For example, if the narration includes a dialog between two actors, both of them constitute a highlight of the narration. A reference direction may change over the time. On FIG. 1, the reference direction 13 may follow the plane while moving. In another example in which the camera is filming a tennis game, two reference directions may follow the players and one reference direction may follow the ball.

Figure 2:
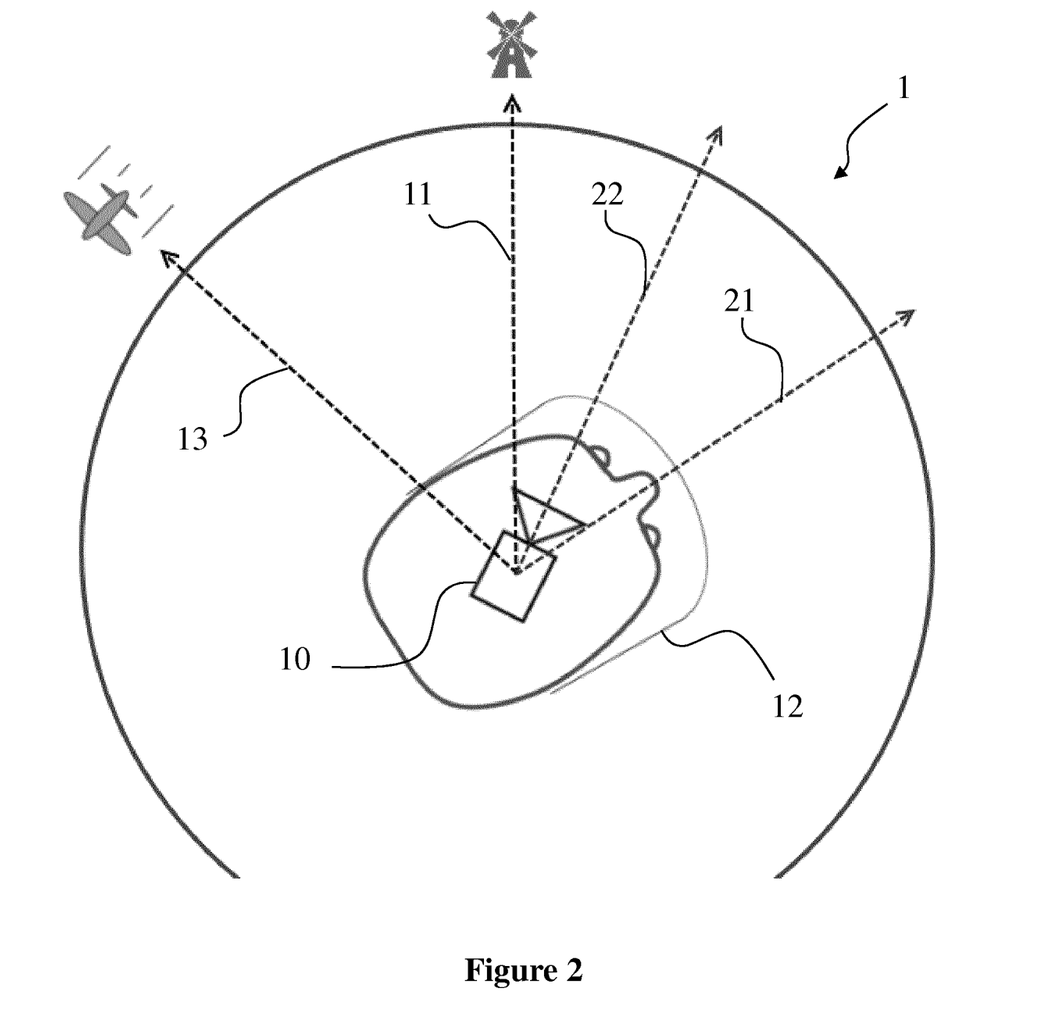
FIG. 2 illustrates the controlled camera system of FIG. 1 at a time t after the initialization of the system, according to a specific embodiment of the present principles.

FIG. 2 illustrates the controlled camera system 1 of FIG. 1 at a time t after the initialization of the system. On FIG. 2, the camera controller 12 is represented as a head mounted display (HMD). The user has rotated his/her head toward a direction 21 (to the right) in the reference frame formed by the center of the camera 10 and the zero direction 11. In the example of the FIG. 2, a reference direction 13 has been obtained (at the left of the zero direction). The camera 10 has been rotated toward a direction 22. On FIG. 2, the camera 10 has been rotated through an angle smaller than the angle formed between the zero direction 11 and the camera controller direction 21. Indeed, as explained by the FIGS. 3a, 3a, 4 and 5, as the angle between the reference direction 13 and the direction obtained through the parameters of the camera controller 12 has increased, the camera aiming direction is computed to create a pseudo-haptic effect. In the example of FIG. 2, the user has rotated his/her head toward the right up to the direction 21 but he/she is seeing what is filmed in the direction 22, less at the right-hand in the environment of the camera. As a consequence of this discrepancy between his/her real movement and the visual feedback from the camera, the user feels a pseudo-haptic resistance. In another embodiment, the camera controller 12 is a mouse device or a joystick and the display is a TV-set or a computer screen. The same pseudo-haptic effect is created thanks to the discrepancy between the camera aiming direction and the direction the user expects to look to according to his/her commands on the camera controller.

Figure 3A:
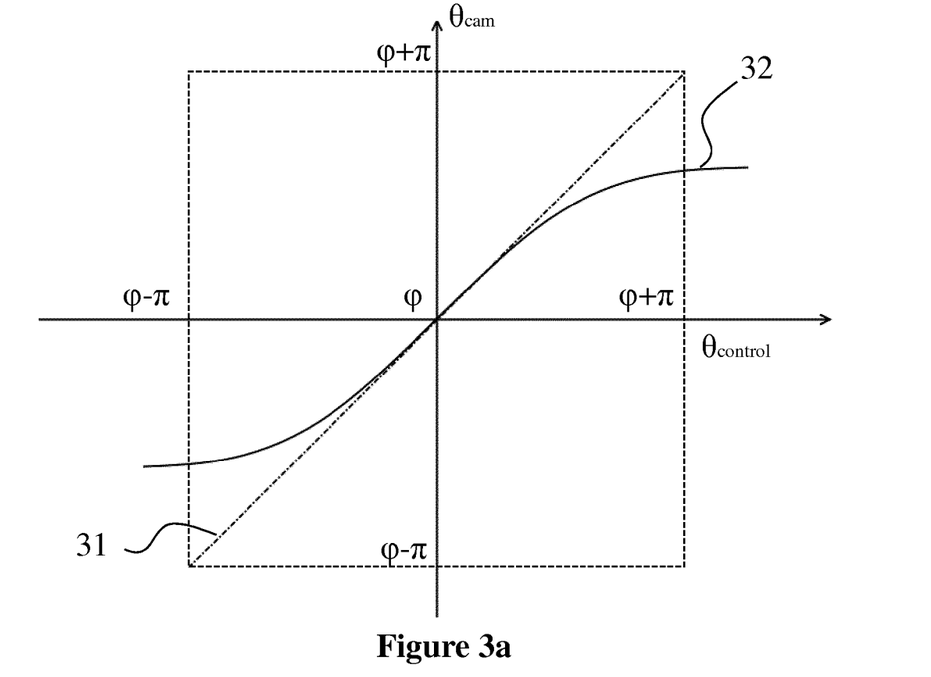
FIG. 3a illustrates an example diagram of the discrepancy between the camera aiming direction and the direction associated with the parameters of the camera controller, as illustrated on FIG. 2, according to a specific embodiment of the present principles.

FIG. 3a illustrates an example diagram of the discrepancy between the camera aiming direction and the direction associated with the parameters of the camera controller. The angle value φ on FIG. 3a corresponds to the angle between the zero direction 11 and a reference direction 13 of FIGS. 1 and 2. The curve 32 represents the angle $\theta_{cam}$ between the zero direction 11 and the camera aiming direction 22 of FIG. 2 according to the angle $\theta_{control}$ between the zero direction 11 and the camera controller direction 21 of FIG. 2. Both domains are circular: values go from φ−π radian to φ+π radian (and φ−π is the same angle than φ+π). The line 31 corresponds to a first person view application: the value of $\theta_{cam}$ always equals the value of $\theta_{control}$. The curve 32 shows an embodiment of the discrepancy function: the more the user is driving its camera controller away from the reference direction, the less the camera is rotating, up to no longer rotate at all. After this point, the curve 32 is flat. Advantageously, as illustrated on the FIG. 3a, the discrepancy function is a sigmoid-like function: its slope equals to 1.0 at φ and approaches to a limit. In a variant, the discrepancy function is piecewise linear: its slope is equals to 1.0 around φ and equals to 0.0 beyond a given threshold. Noticeably, the use of such a discrepancy function breaks the circular property of angle domains. Indeed, when the user commands to the camera controller to rotate through π radians (180°), the camera rotates through less than π radians and, so, does not face the opposite direction. A consequence of this fact is that the angle θ−π is now different from the angle φ+π and the domain of the discrepancy function is extended over these limits. This is illustrated on FIGS. 3a, 3b and 4 by the fact that the curve of the discrepancy functions are drawn over the dashed square.

Figure 3B:
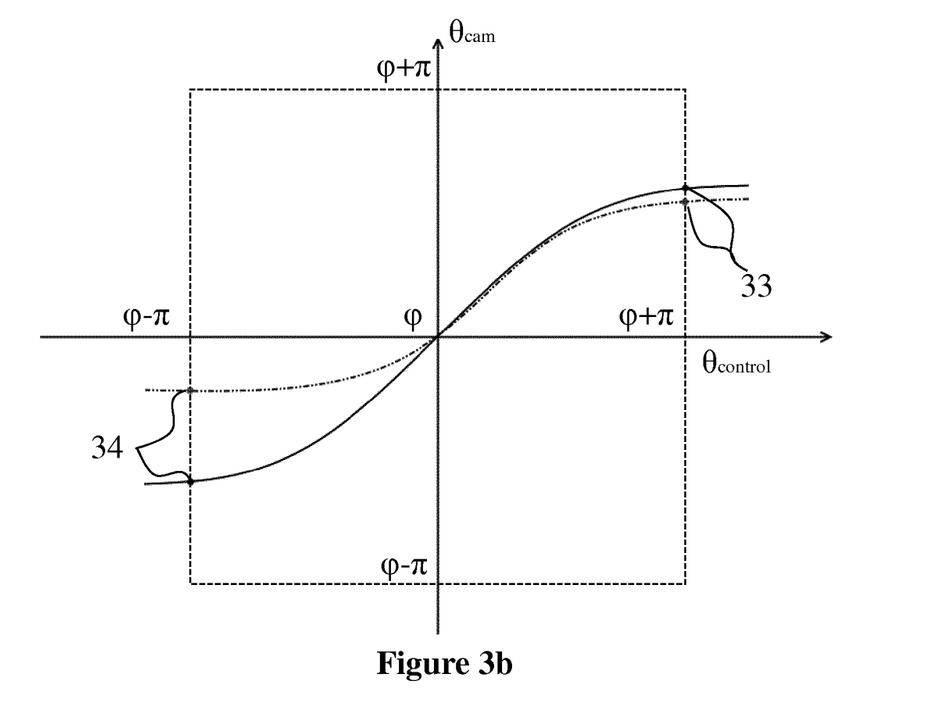
FIG. 3b illustrates settings that the method may use to compute a discrepancy function when the set of reference directions of FIGS. 1 and 2 is changing, according to a specific embodiment of the present principles.

FIG. 3b illustrates settings that the method may use to compute a discrepancy function when the set of reference directions is changing. On FIG. 3b, the discrepancy function is a sigmoid-like function. Its slope is constrained to 1.0 at the value φ. The function is computed according to at least two setting values 33 and 34 which are the values the function reaches when the value of $\theta_{control}$ respectively equals φ+π and φ−π radians. Additional settings may rule the derivative of the function, i.e. the slopes S1 and S2 that the function respectively has at points 33 and 34 (0.0≤S1≤1.0; 0.0≤S2≤1.0) and the speed at which the slope of the function decreases (from 1.0 at the value φ, to S1 φ+π or to S2 at (φ−π). In a variant, the discrepancy function is piecewise linear. Settings 33 and 34 are useful for this kind of discrepancy function too. A list of values between φ−π and φ+π may be used in addition to indicate thresholds for which the slope of the function changes.

Settings data are set to configure the haptic effect. For example, on FIG. 3b, the closer values 33 and 34 are to φ, the more limited the visible part of the scene is. The same way, settings ruling the local slopes of the discrepancy function adjust the pseudo-haptic resistance the user feels through the camera controller when he/she tries to rotate the camera.

Figure 4:
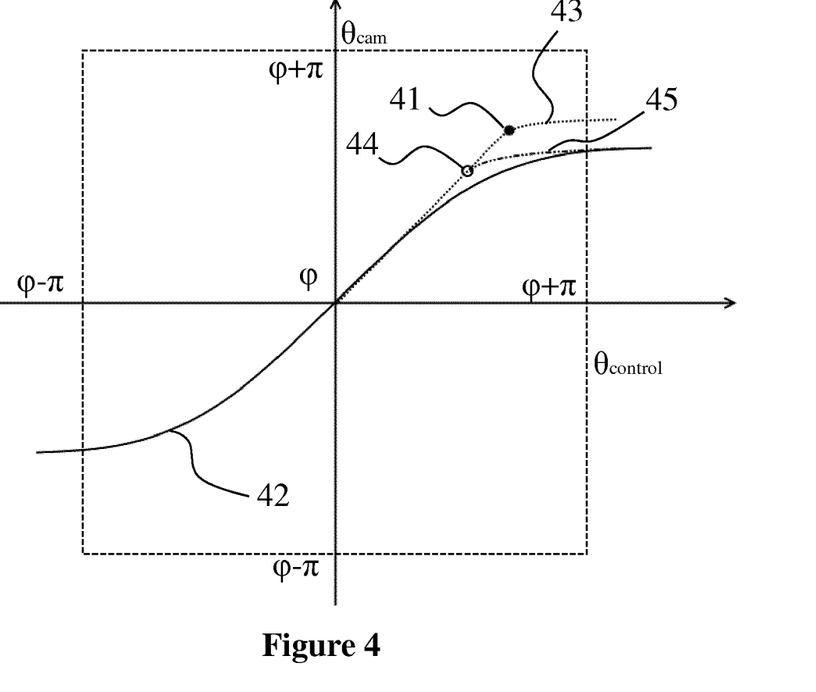
FIG. 4 illustrates an iterative computation of discrepancy functions of FIGS. 3a and 3b, according to a specific embodiment of the present principles.

A discrepancy function is determined (i.e. computed or calculated for instance) when a change in the reference directions set is detected. It may happen that the user does not look to a direction that belongs to the computed discrepancy function at the moment this function is computed (in particular at the starting of the present method). FIG. 4 illustrates an iterative computation of discrepancy functions. On the example of FIG. 4, at the initialization time, the set of reference directions is empty. The user uses the camera controller to make the camera aim at the direction 41 ($\theta_{cam}=\theta_{control}=\theta$). A reference direction φ is obtained and a discrepancy function 42 is computed according to the settings. The point 41 does not belong to the curve of the discrepancy function 42. In order to avoid a sudden shift of the camera's aiming direction, a first discrepancy function 43, which passes through the point 41, is computed. The function 43 is computed under the constraint not to increase the distance with the discrepancy function 42 and to decrease it when tending toward φ. When the user uses the camera controller to rotate the camera toward the direction 100, the camera rotation is facilitated. On the contrary, the rotation is made hard in the opposite direction. When a change of the camera controller is detected, the aiming direction of the camera follows the curve of the function 43 and a second discrepancy function is computed. On the example of FIG. 4, the camera controller reaches the point 44, closer to the reference direction and a second discrepancy function 45 is computed under the same constraints than the function 43. The second discrepancy function is renamed first discrepancy function and the operation is iterated. Because of the computing constraints, the second discrepancy function is getting closer and closer to the discrepancy function 42 and, as a consequence, the wanted pseudo-haptic effect is reached without sudden shift in the aiming direction of the camera.

Figure 5:
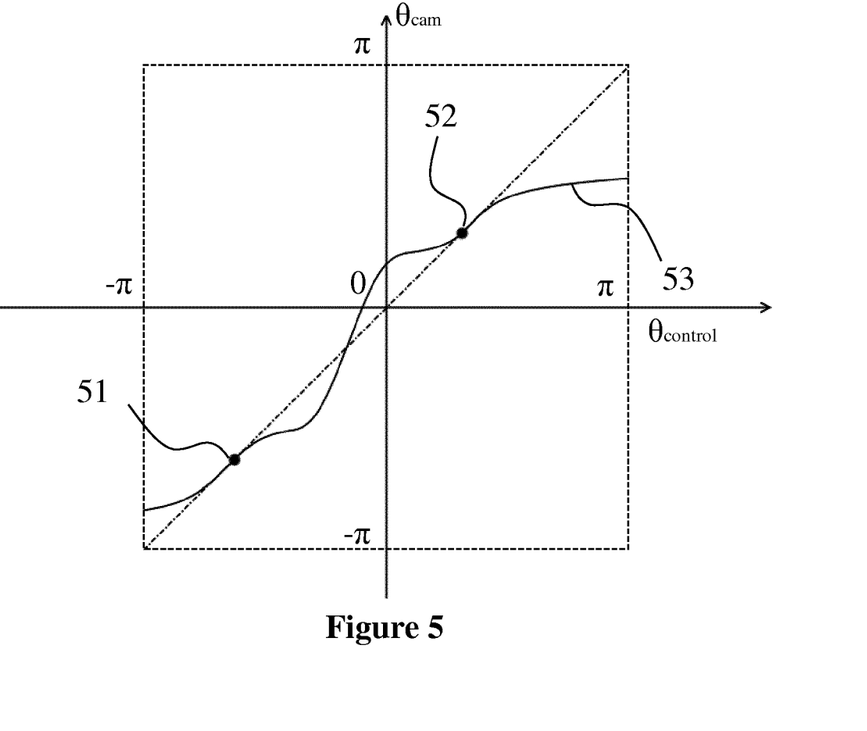
FIG. 5 illustrates a discrepancy function computed when the set of reference directions of FIGS. 1 and 2 contains more than one reference direction, according to a specific embodiment of the present principles.

FIG. 5 illustrates a discrepancy function computed according to a pair of reference directions. Two reference directions have been obtained. For these reference directions, the camera has to aim at the said reference direction. This is illustrated by the points 51 and 52 on the FIG. 5. According to the example of FIG. 5, a discrepancy function 53 is calculated under the following constraints:

The discrepancy functions 53 passes through these points 41 and 42,
The slope of the discrepancy function at points 41 and 42 equals 1.0
The slope of the discrepancy function is lower than or equal to 1.0 when getting apart from points 41 and 42,
The discrepancy function is continuous.

As described herein above, the domain of $\theta_{control}$ is meant to be circular. When the method manages a unique reference direction, it is possible to break this circular property of the domain without disobeying the constraint of continuity, centering the discrepancy function on the reference direction angle value. When there are at least two reference directions, the circular property may be broken only once between two reference direction angle values. On FIG. 5, the choice has been made to keep the continuity in the interval from point 51 to point 52 and to break it in the interval from point 52 to point 51. As a consequence, a pseudo-haptic "magnet effect" is observed in the angular interval from point 51 to point 52 and a pseudo-haptic "resistance effect" is observed over. In a variant, the choice is made to keep the continuity in the interval from point 52 to point 51 and to break it in the interval from point 52 to point 51. In another variant, the choice is made to keep the circular property of the domain of $\theta_{control}$, introducing a double pseudo-haptic magnet effect.

Figure 6:
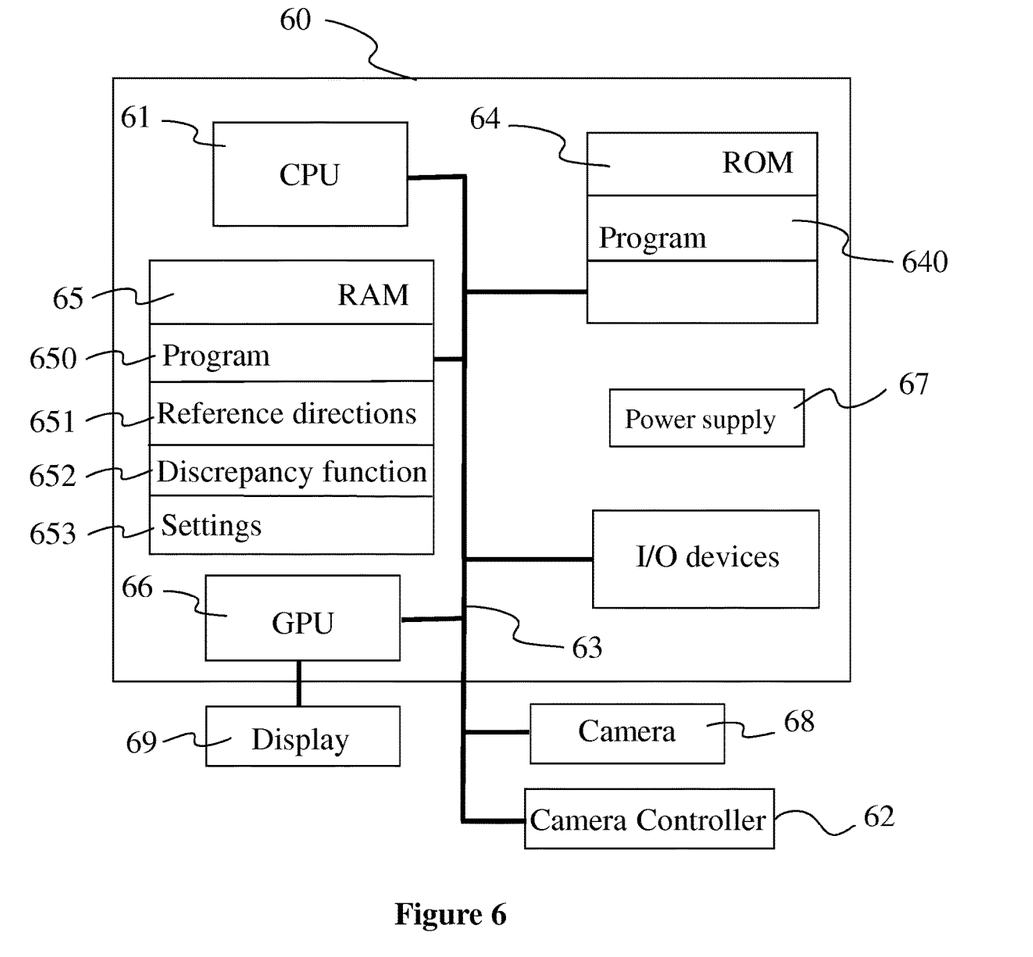
FIG. 6 diagrammatically shows a hardware embodiment of an apparatus configured to process an aiming direction of a camera of FIGS. 1 and 2 according to a discrepancy function as the ones illustrated in FIGS. 3a, 3b, 4 and 5, according to a specific embodiment of the present principles.

FIG. 6 shows a hardware embodiment of an apparatus 60 configured to process an aiming direction of a camera. In this example, the device 60 comprises the following elements, connected to each other by a bus 63 of addresses and data that also transports a clock signal:
  a microprocessor 61 (or CPU),
  a graphics card 66,
  a non-volatile memory of ROM (Read Only Memory) type 64,
  a Random Access Memory or RAM (65), the graphics card 66 may embed registers of random access memory
  A set of I/O (Input/Output) devices such as for example a mouse, a webcam, etc. that are not detailed on FIG. 6, and
  a power source 67.

The device 60 is connected to a camera controller 62. In an embodiment, the camera controller is a joystick, a keyboard or a remote control. In another embodiment, the camera controller is an inertial measurement unit comprising accelerometers and/or gyroscopes for example.

The device 60 is connected to a camera 68 that is equipped to change its aiming direction, i.e. a real camera is motorized and a virtual camera is associated with a program or a script configured to control the camera aiming direction.

Advantageously, the device 60 is connected to one or more display devices 69 of display screen type directly to the graphics card 66 to display images calculated in the graphics card. In a variant, the one or more display device 69 is connected to the graphic card 66 via the bus 63. In a particular embodiment, the camera controller 62 and/or the one or more display device 69 are integrated to the device 60 such as for Head Mounted Devices.

It is noted that the word "register" used in the description of memories 64 and 66 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 61, according to the program in the register 640 of the ROM 64 loads and executes the instructions of the program in the RAM 650.

The random access memory 65 notably comprises:
  in a register 650, the operating program of the microprocessor 61 responsible for switching on the device 60,
  in a register 651, data representative of at least one reference directions,
  in a register 652, data representative of the parameters of a discrepancy function, these parameters being used by the microprocessor 61 to control the aiming direction of the camera,
  in a register 653, data representative of settings used by the microprocessor 61 to compute the parameters of the discrepancy function.

According to one particular embodiment, the algorithms implementing the steps of the method specific to the present disclosure and described hereafter are advantageously stored in a memory GRAM of the graphics card 66 associated with the device 60 implementing these steps.

According to a variant, the power supply 67 is external to the device 60.

Figure 7:
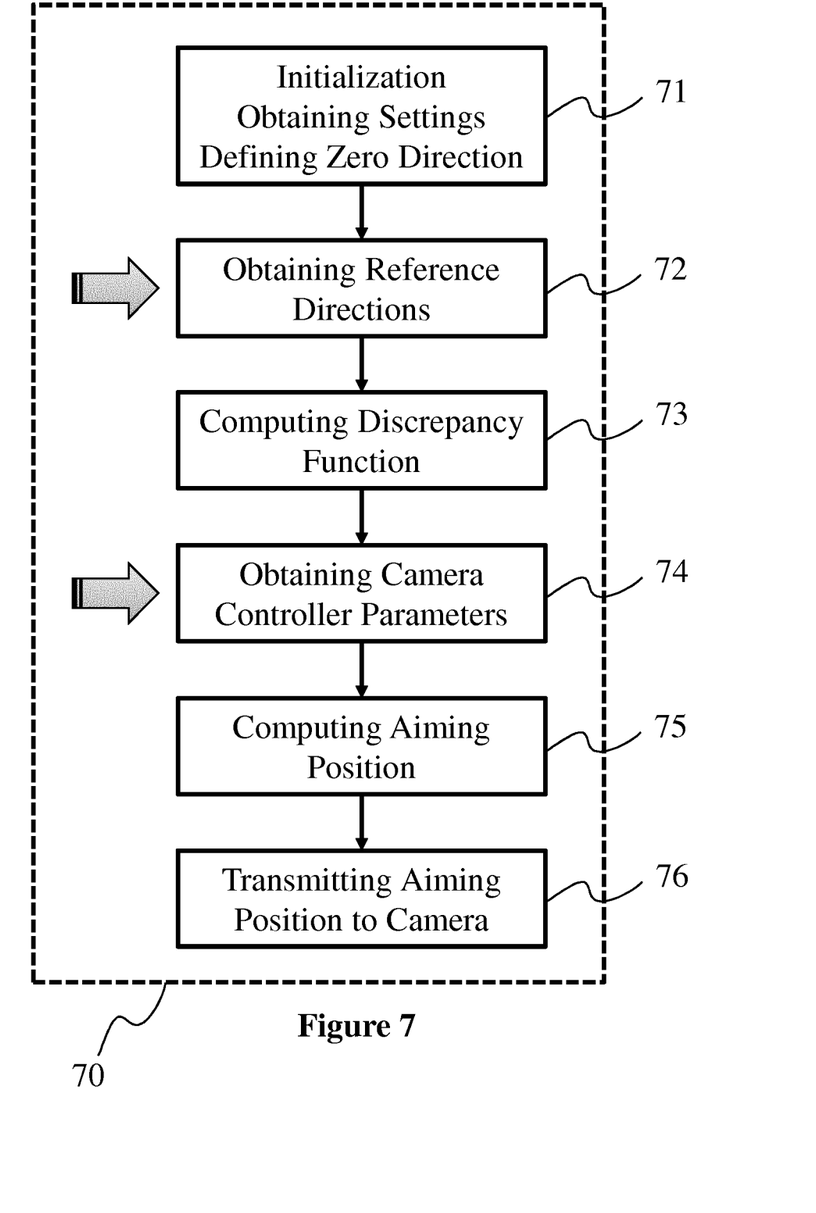
FIG. 7 shows an embodiment of a method of determining an aiming direction of a camera as implemented in a processing device such as the device of FIG. 6 according to a non-restrictive advantageous embodiment of the present principles.

FIG. 7 diagrammatically shows an embodiment of a method 70 as implemented in a processing device such as the device 60 according to a non-restrictive advantageous embodiment.

In an initialization step 71, the device 60 obtains the settings of the method and a Zero Direction. It should also be noted that a step of obtaining an information in the present document can be viewed either as a step of reading such an information in a memory unit of an electronic device or as a step of receiving such an information from another electronic device via communication means (e.g. via a wired or a wireless connection or by contact connection). Obtained information are stored in register 653 of the random access memory 65 of the device 60.

A step 72 consists in obtaining data representative of a set of reference directions. In a first embodiment, the set of reference directions is received from another device via communications means. These data may be associated with the video content or may be provided by a dedicated server. In a variant, reference direction data are read from a file on a storage medium associated with the device 60. In another embodiment, the set of reference directions is obtained by image processing the video content. For instance, the processing of saliency maps of the images of the video content allow to detect highly salient regions. A point of such a region, for example the barycentre or the pixel with the highest saliency, may be used to determine a reference direction. In another embodiment, some objects of the scene that the camera is filming are associated with positioning device. Reference directions are set according to the position of these objects and the position of the camera. When any of these object is moving and/or when the camera is moving, the reference directions are modified.

When a change is detected in the set of known reference directions (even when created by the initialization step 71), a step 73 is executed that computes a discrepancy function. The discrepancy function associate an angle value managed by the camera controller with an angle value corresponding to the aiming direction of the camera. The use of such a function generates a pseudo-haptic effect when using the camera controller as the camera does not react as the user expects. The discrepancy function is computed according to setting data which rule the pseudo-haptic effects. In a variant, additional reference parameters are associated with a reference direction in order to adapt the pseudo-haptic effect to the reference direction. Two occurrences of a similar reference direction may generate different discrepancy functions.

A step 74 consists in detecting changes in the parameters of the camera controller. An angle value, called $\theta_{control}$ in this document, is updated according to the detected change in parameters. This angle is representative of the direction the user would like the camera to aim. A next step 75 is executed when $\theta_{control}$ is updated or when a new discrepancy function has been computed at step 73. In a variant, a timer is associated with the step 74 and a step 75 is executed once a duration value is over even if no change has been detected in the parameters of the step controller or in the set of reference directions at step 72.

The step 75 consists in applying the discrepancy function on $\theta_{control}$ The result of this application is an aiming direction for the camera.

An optional step 76 consists in transmitting the computed aiming direction to the camera. In a variant, the aiming direction is transmitted only if it differs from the actual aiming direction of the camera for at least a threshold value (e.g. 1° or 5° or 10°). In another variant, the aiming direction is repeatedly transmitted to the camera even if no new aiming direction has been calculated at step 75.

The method is activated at step 72 if a change of the set of reference directions is detected or at step 74 if a change in of the parameters of the camera controller is detected. In a variant, the method is activated by the running out of a timer.

Naturally, the present disclosure is not limited to the embodiments previously described. In particular, the present disclosure is not limited to a method of determining an aiming position command to a motorized camera but also extends to a method of transmitting an aiming direction to a camera and to a method of controlling the aiming direction of a motorized camera. The implementation of calculations necessary to compute the aiming position are not limited to an implementation in a CPU but also extends to an implementation in any program type, for example programs that can be executed by a GPU type microprocessor.

The implementations described herein may be implemented in, for example, a method or a process, an apparatus, a software program, a data stream or a signal. Even if only discussed in the context of a single form of implementation (for example, discussed only as a method or an apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, smartphones, tablets, computers, mobile phones, portable/personal digital assistants ("PDAs"), and other devices.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of determining an aiming direction of a virtual camera of a head mounted display device when rendering an immersive content in the head mounted display device, the method comprising:
   obtaining at least one reference direction pointing to a region of interest of the immersive content;
   obtaining an orientation of the head mounted display device;
   determining parameters representative of a function, according to the at least one reference direction, the function representing a difference between the aiming direction of the virtual camera and the orientation of the head mounted display device;
   when the reference direction and the orientation of the head mounted display device are different, determining a new aiming direction of the virtual camera by applying the function on the orientation of the head mounted display device to create a difference between the orientation of the head mounted display device and the new aiming direction of the virtual camera, wherein the new aiming direction is between the reference direction and the orientation of the head mounted display device and applying the function reduces the difference as the orientation approaches the reference direction; and rotating the aiming direction of the virtual camera to the new aiming direction to display visual feedback including an image from the virtual camera at the new aiming direction that is different from the orientation of the head mounted display device.

2. The method according to claim 1, wherein the function is a sigmoid function based on reference parameters associated with the at least one reference direction.

3. The method according to claim 1, wherein the at least one reference direction is determined according to a location of the virtual camera and a location of an object.

4. The method according to claim 1, wherein the discrepancy between the new aiming direction and the orientation of the head mounted display device changes as the orientation of the head mounted display device approaches the reference direction.

5. The method according to claim 1, wherein the at least one reference direction is associated with reference parameters that are used for determining the parameters representative of the function.

6. The method according to claim 1, wherein the at least one reference direction changes over time.

7. The method according to claim 1, further comprising transmitting the new aiming direction to the virtual camera.

8. The method according to claim 1, wherein the number of reference directions changes over time.

9. The method of claim 1, wherein rotation of the virtual camera toward the reference direction is facilitated and rotation opposite to the reference direction is made harder.

10. The method of claim 1, further comprising computing the new aiming direction to create a pseudo-haptic effect associated with visual feedback from the virtual camera at the new aiming direction.

11. The method of claim 1, wherein a curve of the function avoids a sudden shift of the virtual camera.

12. The method according to claim 1, wherein the difference between the aiming direction of the virtual camera and the orientation of the head mounted display device includes an angular difference in at least two directions of an x-direction, a y-direction, and a z-direction.

13. The method according to claim 1, further comprising:
detecting a change in the at least one reference direction;
determining parameters representative of a second function, according to the change in at least one reference direction, the second function representing a difference between the aiming direction of the virtual camera and the orientation of the head mounted display device;
determining a second new aiming direction of the virtual camera by applying the second function on the orientation of the head mounted display device to create a second difference between the orientation of the head mounted display device and the second new aiming direction of the virtual camera; and
rotating the aiming direction of the virtual camera to the second new aiming direction such that visual feedback from the virtual camera at the second new aiming direction that is different from the orientation of the head mounted display device.

14. The method according to claim 1, wherein obtaining the at least one reference direction comprises determining a location for a region of interest in the immersive content and determining the reference direction for the region of interest.

15. The method of claim 1, wherein the rotating results in a discrepancy between the orientation of the head mounted display and the new aiming direction.

16. The method of claim 1, wherein applying the function reduces the difference as the orientation of the head mounted display device approaches the reference direction.

17. The method according to claim 1, further comprising:
obtaining at least one second reference direction pointing to a second region of interest of the immersive content;
determining parameters representative of a second function, according to the at least one second reference direction, the second function representing a difference between the aiming direction of the virtual camera and the orientation of the head mounted display device.

18. A head mounted display device comprising:
at least one processor; and
at least one memory having stored instructions operative, when executed by the at least one processor, to cause the head mounted display device to determine an aiming direction of a virtual camera of the head mounted display device when rendering an immersive content in the head mounted display device by:
obtaining at least one reference direction pointing to a region of interest of the immersive content;
obtaining an orientation of the head mounted display device, wherein the region of interest is not displayed at the orientation of the head mounted display device;
determining parameters representative of a function, according to the at least one reference direction, the function being representative of a difference between the aiming direction of the virtual camera and the orientation of the head mounted display device;
when the reference direction and the orientation of the head mounted display device are different, determining a new aiming direction of the virtual camera by applying the function on the orientation of the head mounted display device to create a difference between the orientation of the head mounted display device and the new aiming direction of the virtual camera, wherein the new aiming direction is between the reference direction and the orientation of the head mounted display device and applying the function reduces the difference as the orientation approaches the reference direction; and
rotating the aiming direction of the virtual camera to the new aiming direction to display visual feedback including an image from the virtual camera at the new aiming direction that is different from the orientation of the head mounted display device.

19. The head mounted display device according to claim 18, wherein the function is a sigmoid function.

20. The head mounted display device according to claim 18, wherein the at least one reference direction is determined according to a location of the virtual camera and a location of an object.

21. The head mounted display device according to claim 18, wherein the at least one reference direction is associated with reference parameters that are used for determining the parameters representative of the function.

22. The head mounted display device according to claim 18, wherein the at least one reference direction changes over time.

23. The head mounted display device according to claim 18, further comprising a transmitter for transmitting the new aiming direction to the virtual camera.

24. The head mounted display device according to claim 18, wherein the instructions facilitate rotation of the virtual camera toward the reference direction and make harder rotation opposite to the reference direction.

25. The head mounted display device according to claim 18, wherein the instructions further cause the apparatus to create a pseudo-haptic effect associated with the new aiming direction.

26. A non-transitory processor-readable storage medium having stored instructions that, when executed by a processor, cause the processor to determine an aiming direction of a virtual camera of a head mounted display device when rendering an immersive content in the head mounted display device by:

obtaining at least one reference direction pointing to a region of interest of the immersive content;
 obtaining an orientation of the head mounted display device;
 determining parameters representative of a function, according to the at least one reference direction, the function representing a difference between an aiming direction of the virtual camera and the orientation of the head mounted display device;
 when the reference direction and orientation of the head mounted display device are different, determining a new aiming direction of the virtual camera by applying the function on the orientation of the head mounted display device to create a difference between the orientation of the head mounted display device and the new aiming direction of the virtual camera; and
 rotating the aiming direction of the virtual camera to the new aiming direction to display visual feedback from the virtual camera at the new aiming direction that is different from the orientation of the head mounted display device.

* * * * *